April 1, 1924.

R. JEFFRIES

TROLLING SPOON

Filed May 10, 1923

1,488,601

INVENTOR
ROBERT JEFFRIES

BY

ATTORNEYS

Patented Apr. 1, 1924.

1,488,601

UNITED STATES PATENT OFFICE.

ROBERT JEFFRIES, OF EGMOND, BRITISH COLUMBIA, CANADA.

TROLLING SPOON.

Application filed May 10, 1923. Serial No. 638,060.

*To all whom it may concern:*

Be it known that I, ROBERT JEFFRIES, a subject of the King of Great Britain, and a resident of Egmond, in the Province of British Columbia, Canada, have invented certain new and useful Improvements in Trolling Spoons, of which the following is a specification.

My invention relates to improvements in trolling spoons the objects of which are to provide means within the spoon where a live bait may be carried, that its attraction for fish is supplemented, and which consists essentially of a spoon formed preferably to the shape of a fish, the body of which forms a receptacle for bait as will be more fully described in the following specification, in which:—

In the drawings like characters of reference indicate corresponding parts in each figure.

Figures 1, 2, 3:
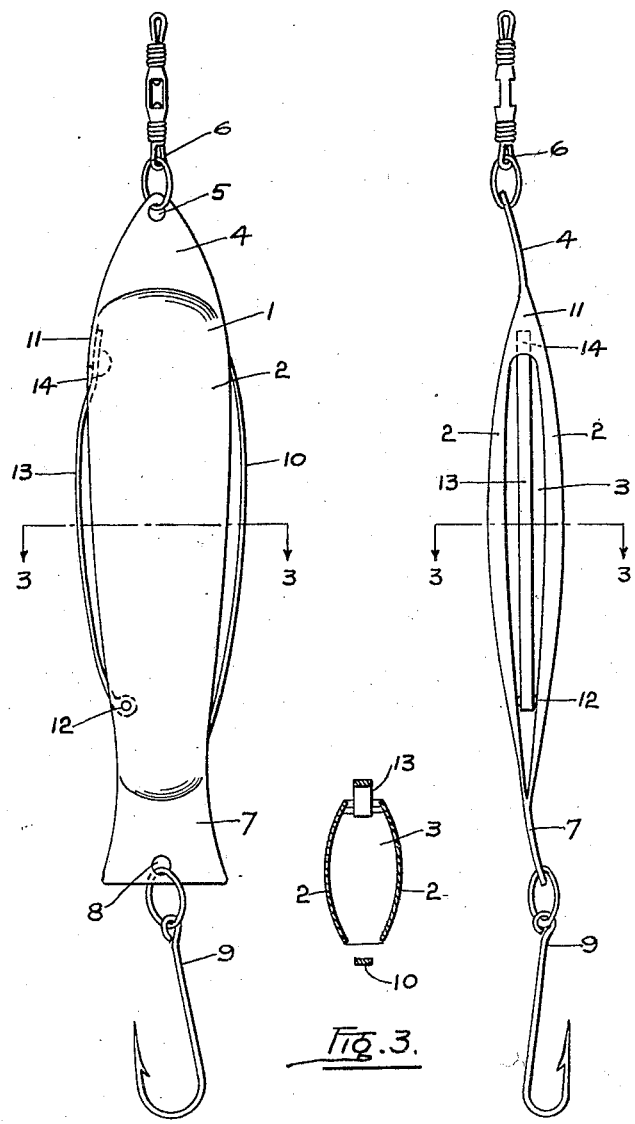
Fig. 1 is a side view of my invention.
Fig. 2 is a view looking down.
Fig. 3 is a transverse sectional view taken on the line 3—3 of Figs. 1 and 2.

The numeral 1 indicates generally the body of my invention which will preferably be of a shape resembling a fish and is formed of a pair of side plates 2 spaced apart for the major and intermediate portion of their length to form a cavity 3, the side plates where spaced one from the other are curved to present a convex outer surface.

The numeral 4 indicates a head portion which is horizontally curved and is provided at its outer end with an aperture 5 for the purpose of attaching a swivel and ring 6 by which the device is fastened to the trolling line. 7 indicates the tail portion which is preferably curved in the opposite direction to the head portion 4, the tail portion being apertured as at 8 to receive a ringed hook 9. The numeral 10 indicates a strip of metal extending below the body 1 and connected at opposite ends to the side plates 2 at their intersections to form a partial bottom closure for the cavity 3. 11 is a closure plate connecting the upper forward ends of the side plates 2. 12 is a pin carried by the upper rear ends of the side plates 2 upon which is fulcrumed a hinge strip 13, the hinge is preferably made of a light spring material, the outer end 14 of which is adapted to be tucked into the cavity 3 and to engage the closure plate 11 to prevent the cavity from being inadvertently opened.

Having thus described the several parts of my invention I will now briefly explain its use.

The hinge strip 13 is withdrawn from engagement with the closure plate 11 and is swung back, leaving the cavity 3 of the body 1 fully open, a piece of herring or other suitable live bait is inserted, and the hinge strip restored to its previous position, effectively enclosing the bait in the cavity so that it cannot be removed when being trolled through the water. The trolling spoon being of bright metal and being formed with curved head and tail portions glitters and follows a diverging path when being drawn through the water attracting fish thereto, the live bait serving to still further attract the fish thereto through their sense of smell. The bait being effectively enclosed within the body may effectively exude its odours, but is not subject to removal by the fish, hence the trolling spoon once baited is effective for catching any number of fish and does not need rebaiting as long as the bait remains fresh.

What I claim as my invention is:

1. A trolling spoon comprising a pair of side plates connected together at each end and spaced apart throughout their entire width intermediate the connected ends to provide a bait-receiving cavity, and a pair of strips arranged to partially close the sides of the cavity to retain the bait therein, one of said strips being displaceable to provide for positioning and removal of the bait.

2. A trolling spoon comprising a body including side plates connected together at each end and spaced apart intermediate the connected ends to provide a bait-receiving cavity, and means for retaining bait in said cavity, the connected ends of the side plates being oppositely curved with respect to the longitudinal axis of the body.

Dated at Egmond this 5th day of March 1923.

ROBERT JEFFRIES.

Witnesses:
 ROY WEST,
 STEPHEN JOHSTON.